US00RE45824E

(19) United States
(12) Reissued Patent
French

(10) Patent Number: US RE45,824 E
(45) Date of Reissued Patent: Dec. 22, 2015

(54) FRICTIONLESS SELF-POWERED MOVING DISPLAY

(75) Inventor: William W. French, Cardiff, CA (US)

(73) Assignee: Turtletech Design, Inc

(21) Appl. No.: 11/973,289

(22) Filed: Oct. 4, 2007

Related U.S. Patent Documents

Reissue of:
(64) Patent No.: 6,952,151
Issued: Oct. 4, 2005
Appl. No.: 11/027,261
Filed: Dec. 30, 2004

U.S. Applications:
(60) Division of application No. 10/110,879, filed as application No. PCT/US00/28038 on Oct. 11, 2000, now Pat. No. 6,853,283, said application No. 10/110,879 is (Continued)

(51) Int. Cl.
*G09F 19/00* (2006.01)
*G09F 19/12* (2006.01)
*G09F 19/02* (2006.01)

(52) U.S. Cl.
CPC ..... *G09F 19/12* (2013.01); *G09F 19/02* (2013.01)

(58) Field of Classification Search
CPC ..... G09F 19/12; G09F 19/02; G09F 11/23
USPC ..... 244/166; 40/427–444, 406, 407; 335/296, 285
See application file for complete search history.

(56) References Cited

U.S. PATENT DOCUMENTS 2,924,033 A 2/1960 Lanctot
3,010,224 A 11/1961 Roberts (Continued)

FOREIGN PATENT DOCUMENTS

JP 50-33175 4/1975
JP 56016111 * 2/1981

(Continued)

OTHER PUBLICATIONS

Kanesaka & Sakai; partial uncertified English translation of JP 59-115377.

(Continued)

*Primary Examiner* — Kenneth J Whittington
(74) *Attorney, Agent, or Firm* — Charmasson, Buchaca & Leach, LLP

(57) ABSTRACT

An intriguing and educational display structure (1) appears to be spinning upon itself without any apparent drive mechanism, power supply or bearing. The structure comprises two concentric hollow spheres (3, 5) spaced apart by a transparent fluid (6). The outer sphere is totally transparent, immobile, and may rest on a tripod (2) or other type of support. The inner sphere may be partially transparent or translucent and carries over its surface, a design such as a map of the world (7). The inner sphere rotates within, and independently from, the first outer one. The internal, that is self-contained, drive mechanism uses either a conventional electrical motor (8) with its own field winding and commutator, or one made of a rotor comprising a cross-array of electromagnets (AC, BD) that interact with an ambient magnetic field such as the earth magnetic field. The power supply comes preferably from a photovoltaic collector (13) mounted within the inner sphere or from a receiver (27) of RF waves or other EM radiation.

42 Claims, 9 Drawing Sheets

Related U.S. Application Data a continuation-in-part of application No. 10/049,406, filed as application No. PCT/US00/26394 on Sep. 26, 2000, now Pat. No. 6,937,125.

(60) Provisional application No. 60/160,142, filed on Oct. 18, 1999.

(56) References Cited

U.S. PATENT DOCUMENTS

| | | | | |
|---|---|---|---|---|
| 3,190,581 | A * | 6/1965 | Wilson, Jr. | 244/166 |
| 3,975,845 | A | 8/1976 | Mellard | |
| 5,213,627 | A | 5/1993 | Marquardt et al. | |
| 5,258,209 | A | 11/1993 | Bankert et al. | |
| 5,291,674 | A | 3/1994 | Torrence | |
| 5,313,727 | A | 5/1994 | Murray, Jr. | |
| 5,644,078 | A * | 7/1997 | Ahdoot | 73/178 R |
| 6,332,282 | B1 | 12/2001 | Lin | |
| 6,340,099 | B1 | 1/2002 | Ho et al. | |
| 6,374,522 | B1 | 4/2002 | Lo | |
| 6,385,880 | B1 | 5/2002 | Naragon | |
| 6,493,971 | B1 | 12/2002 | Yuen | |
| 2002/0184801 | A1 | 12/2002 | Naragon | |

FOREIGN PATENT DOCUMENTS

| | | | |
|---|---|---|---|
| JP | 59-115377 | A | 8/1984 |
| JP | 60-36776 | | 3/1985 |
| JP | 60-147681 | A | 8/1985 |
| JP | 3-274355 | A | 12/1991 |
| JP | 5-7669 | A | 1/1993 |
| JP | 5-307354 | A | 11/1993 |
| JP | 6-217507 | A | 8/1994 |
| JP | 7-308462 | A | 11/1995 |
| JP | 9-140832 | A | 6/1997 |
| JP | 10-6685 | A | 1/1998 |
| JP | 10-137451 | A | 5/1998 |
| JP | 10-171383 | A | 6/1998 |
| JP | 11-149269 | A | 6/1999 |

OTHER PUBLICATIONS

Kanesaka & Sakai; partial uncertified English translation of JP 60-147681.

Kanesaka & Sakai; partial uncertified English translation of JP 3-274355.

Kanesaka & Sakai; partial uncertified English translation of JP 7-308462.

Foster, Julie; English translation of JP 10-171383.

Patent Abstracts of Japan, English abstract of JP 10-171383.

Kanesaka & Sakai; partial uncertified English translation of JP 50-33175.

Kanesaka & Sakai; partial uncertified English translation of JP 60-36776.

Kanesaka & Sakai; partial uncertified English translation of JP 5-7669.

Kanesaka & Sakai; partial uncertified English translation of JP 5-307354.

Kanesaka & Sakai; partial uncertified English translation of JP 6-217507.

Kanesaka & Sakai; partial uncertified English translation of JP 9-140832.

Kanesaka & Sakai; partial uncertified English translation of JP 10-6685.

Kanesaka & Sakai; partial uncertified English translation of JP 10-137451.

English Patent Abstract of JP 10-137451.

Kanesaka & Sakai; partial uncertified English translation of JP 11-149269.

* cited by examiner

FIG 14
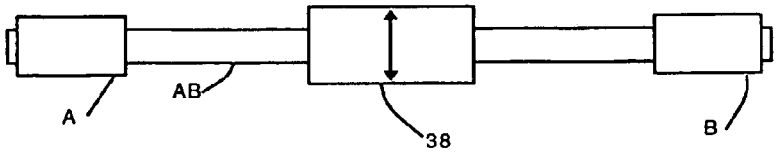
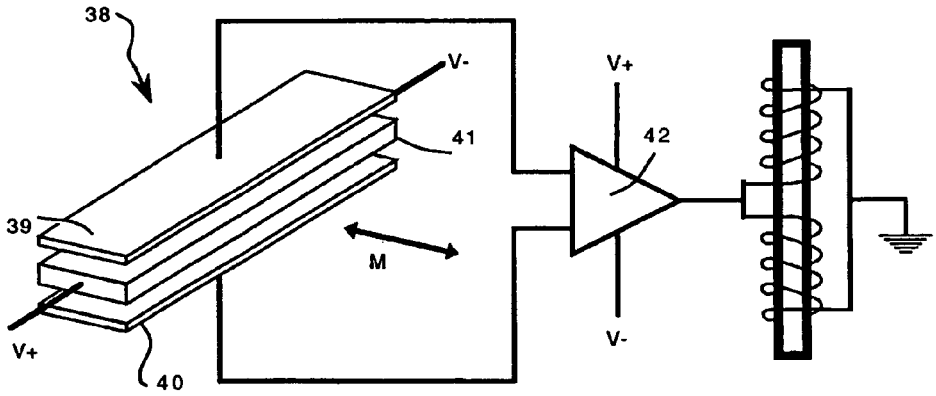
FIG 15
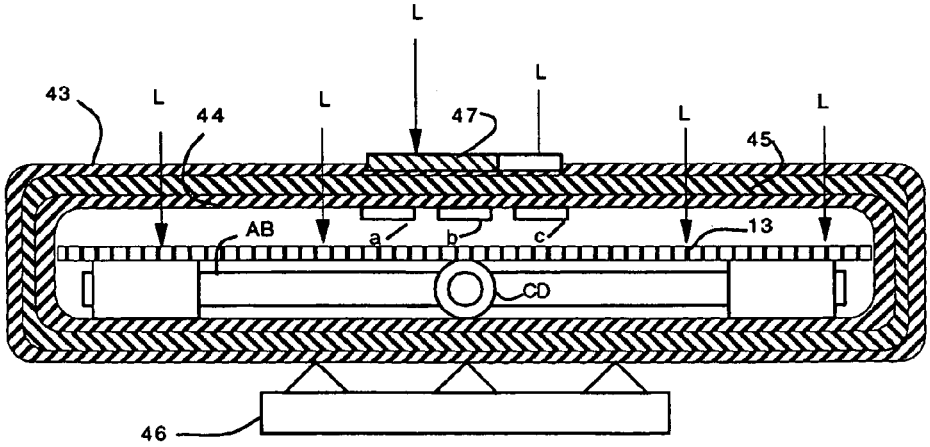
FIG 16

FRICTIONLESS SELF-POWERED MOVING DISPLAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This is a divisional of U.S. patent application Ser. No. 10/110,879 filed Apr. 16, 2002, now U.S. Pat. No. 6,853,283, which is a U.S. national entry of PCT/US00/28038 filed Oct. 11, 2000 which claims the benefit of U.S. provisional application Ser. No. 60/160,142 filed Oct. 18, 1999. U.S. patent application Ser. No. 10/110,879 is also a continuation-in-part of U.S. patent application Ser. No. 10/049,406, filed Feb. 6, 2002 which is a U.S. national entry of PCT/US00/26394, filed Sep. 26, 2000, which claims the benefit of U.S. provisional application Ser. No. 60/160,142 filed Oct. 18, 1999.

FIELD OF THE INVENTION

The instant invention relates to moving display devices, and more particularly to structures that are supported by, or otherwise in contact with, other objects, but appear to move on their own in spite of commonly held expectations about frictional drag between objects in contact.

BACKGROUND OF THE INVENTION

Various types of novelty structures which move with either no apparent support, drive mechanism, or power input are often used as toys, decorative conversation pieces or advertising media. Various embodiments of such structures have been disclosed in U.S. Pat. Nos. 3,593,444 Akrongold, 4,196,899 Patterson, 5,435,086 Huang, 5,435,086 Huang et al., 5,442,868 McDarren et al, 5,893,789 Li-Hsiung, Japanese Patents Nos. 10137451, 101431101, and 10171383, all by Hirose Mamoru, Japanese Patents Nos. 7210081,7219426, and 7239652 all to Takagi Hiroshi and German Patents Nos. DE 19706736 Fushoellier, DE3725723 Steinbrinck, and DE 41377175 Lang. The prior art embodiments generally include structural elements and operational modes that make it clear to a casual observer that the moving bodies of prior art displays simply move relative to a container substantially surrounding the body, or move relative to an object in contact with the body by means of a bearing.

The countertorque-producing mechanisms and their supports are very evident to an observer, and do not create any interest or appreciation of ambient energy fields.

The present invention results from an attempt to devise an intriguing and educational structure that includes elements that appear to be moving on their own, while in contact with other relatively stationary objects, in spite of common sense ideas about friction.

SUMMARY OF THE INVENTION

The principal and secondary objects of this invention are to provide the simplest and least power-demanding apparently moving structure that can operate for extremely long periods of time without any apparent driving mechanism, input of power, or support bearing, and that may be suitable for use as a toy, advertising medium, novelty, or robotic component of a remote space or underwater installation.

In the preferred embodiment of the invention, these and other valuable objects are achieved by floating a sealed and hollow enclosure made of a transparent or translucent material within a volume of fluid held within a transparent sealed container of the same shape as the enclosure and mounted concentrically around it. The outer container is suspended or otherwise supported by a tripod or other like structure. The internal enclosure carries, over its surface, a graphic design such as a map of the world, and is made to spin upon itself independently from the outer container. Due to the transparency of the container and fluid, these components are not seen by the naked eye focused on the design covering the surface of the inner enclosure. Accordingly, the design appears to be spinning without any bearing contact with the external support structure. The internal drive mechanism is anchored, in other words, derives its spinning countertorque from a weight which orients itself in response to gravity. The drive mechanism can be a CONVENTIONAL motor with its own armature, field magnet and commutator, or can be constituted by a circular array of electromagnets acting as a rotor as they are selectively enabled by an electronic or mechanical commutator in co-reaction with, or biased by, either the earth's magnetic field, another man-made magnetic field, or the direction of ambient electromagnetic radiation or gravity.

Various commutating mechanisms for selectively and sequentially enabling the electromagnets are disclosed including a mechanical brush and commutator assembly, an optical shutter that masks specific photo cells dedicated to particular electromagnets, an assembly that senses the direction of light to commutate appropriately, and an electronic impulse distributor.

The drive mechanism is, in a general sense, a mechanism that creates relative force urging the motion of a body, such as the enclosure, relative to an element external to the body. Power for the drive mechanism can be provided by means external to the structure such as light incident on photovoltaic cells integral to the body, or by sources internal to the structure, such as batteries.

The preferred embodiment of the invention will be perceived as a replica of the planet earth floating in space and spinning forever in a stately way, autonomous, and guided by the interplay of solar energy, gravity and geomagnetic forces; a true icon for of a sustainable energy future for the earth.

The moving body can be an enclosure, preferably supported by buoyant forces, but may also be supported by any type of bearing, preferably disposed so that the bearing structure is not obvious to a casual observer. The buoyant forces may be provided by a liquid or a gas, including air.

In embodiments of the drive mechanism where a man-made external energy field whether photic or magnetic is used, rotation of the field may provide the spinning force applied to the enclosure.

The drive mechanism is preferably self-contained, that is, housed within the container, if not the enclosure.

BRIEF DESCRIPTION OF THE DRAWING

FIG. 14 is a top, diagrammatic view of a single electromagnet version of the drive mechanism;

FIG. 15 is an electrical diagram of the directional bearing locator therefor;

FIG. 16 is a cross-sectional diagrammatic view of a cylindrical embodiment of the invention.

DESCRIPTION OF THE PREFERRED EMBODIMENT OF THE INVENTION

Figure 1:
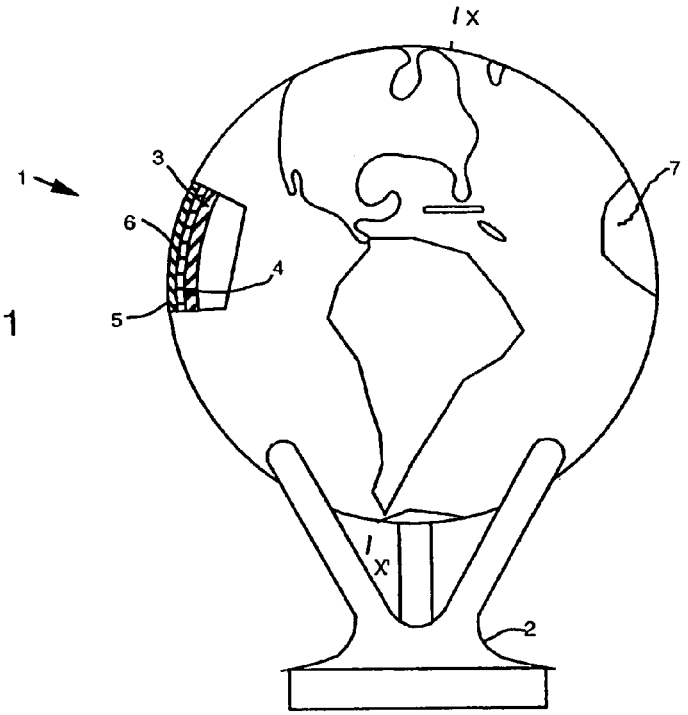
FIG. 1 is a front elevational view of the preferred embodiment of the invention.
Figure 2:
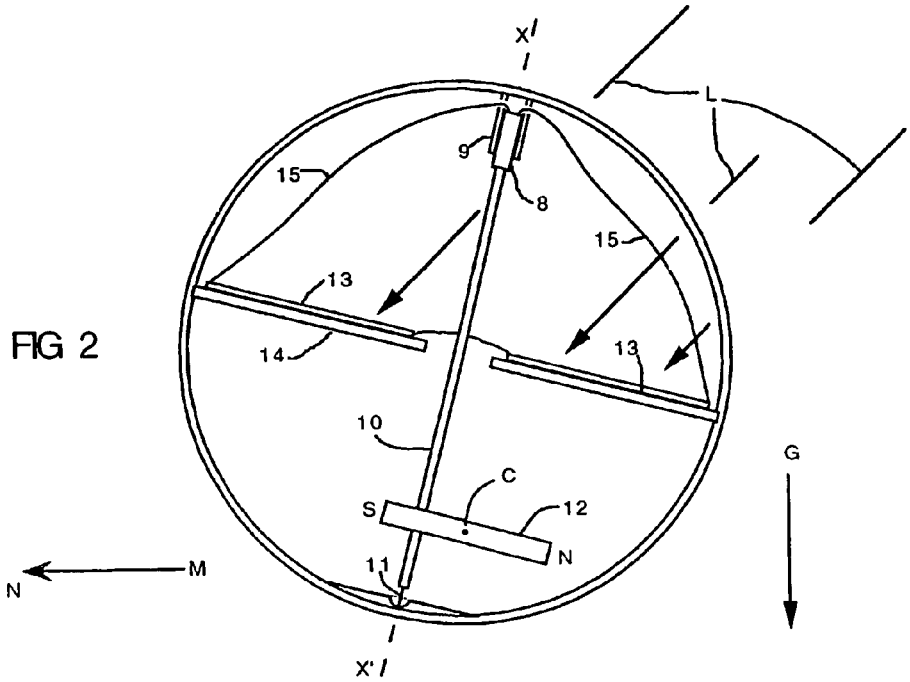
FIG. 2 is a cross-sectional view of the enclosure exposing the internal drive mechanism.

Referring now to the drawing, there is shown in FIGS. 1 and 2 the first embodiment of the invention in the form of a globe 1 which rests on a three-pronged support 2. The globe comprises a spherical, closed and sealed enclosure 3 made of two hemispheric shells of acrylic glued together along an equatorial seam 4. The enclosure 3 is concentrically surrounded by a spherical container 5 preferably made of transparent acrylic in the same manner as the enclosure 3. The enclosure 3 and the container 5 are separated by a small space filled with a liquid 6 so that the enclosure 3 is supported and surrounded by the liquid 6, and can spin upon itself about an axis X-X' independently of the container 5. Painted or etched upon the outer surface of the enclosure 3 is a graphic design, in this case, a map of the world 7. The weight of the enclosure is appropriately distributed to place the structure in the desired orientation.

The enclosure 3 is preferably translucent. In other words, it is permeable to light waves but can conceal the drive mechanism inside it so that it becomes invisible to a casual observer. The liquid 6 is also transparent and preferably comprises two immiscible fluids such a fluoro-carbon PFPE 5060 available from the 3-M Company of Minneapolis, Minn. and a hydrocarbon fluid, NORPAR 12, available from the EXXON Company of Houston, Tex. in a density ratio of 1.68 to 0.75 respectively. The higher density fluorocarbon fluid will normally occupy the lowermost part of the space between the enclosure and the container, and stabilize the floating structure. Any optical distortion caused by the different indexes of refraction of the fluids is least likely to be noticed in that region of the display. The fluids have been selected by reason of their immiscibility, their low wetability, noncorrosivity, relative densities and coefficient of thermal expansion in relation to that of the acrylic material used in the fabrication of the two spheres. With this combination of liquids and the concentric arrangement of the sphere, any material expansion or constriction due to changes in temperature does not cause any risk of deformation or breakage.

Visual features 7 on the inner or outer surface of the enclosure 3 will appear to be on the outer surface of the container 5 with the proper choices of indexes of refraction and dimensions, according to well-known principles of optical refraction. This illusion works best if the container is free of visible features, but it can have a uniform tint that does not give a viewer a clue that it is not rotating. Alternatively, visual features can be printed on the container, or objects can be floated within the fluid to create other amusing optical effects.

As shown in FIG. 2, the internal drive mechanism comprises an electrical motor 8 whose stator and housing are fixedly held by a tubular casing 9 also fixedly secured to the inside wall of the enclosure 3. A shaft 10 projecting from the rotor of the motor is supported at its distal end by a pin bearing 11 on the antipodal part of the enclosure inside wall surface. A body mass or weight 12 is fixedly attached to the shaft with its center of gravity C held distally from it. The weight responding to the gravity G of the earth causes the shaft or axle 10 and the axis of rotation X-X'; to tilt slightly in order to place the weight in its lowermost possible elevation. The weight 12 acting as a gravity sensor, tends to oppose the rotation of the shaft. Indeed, any rotation of the shaft about axis X-X'; would result in an elevation of the center of gravity C against the pull of the earth's gravity. Accordingly, while the axle 10 is in the illustrated position, the powering of the motor 8 will cause the rotation of the stator and the entire enclosure and drive mechanism save for the axle immobilized by the weight 12 acting as a directional bearing locator, anchor and countertorque element. The weight can advantageously be magnetized so that it will align itself with the earth magnetic field and further stabilize the structure. In which case, the center of gravity G needs not be offset.

A multi-element photovoltaic collector 13 is mounted on the upper surface of an equatorial septum 14 fixedly connected to the enclosure 3. Light rays or waves L passing through the transparent container and liquid, and the translucent wall of the enclosure 3 impinge upon the collector 13. The resulting electrical current is fed to the motor 8 through a pair of conductors 15. Accordingly, to the naked eye, the structure appears like a sphere spinning upon itself without any apparent supply of power, drive mechanism, or support bearings. It should be noted that the structure can be activated by solar light or any kind of man-made illumination.

Figure 3:
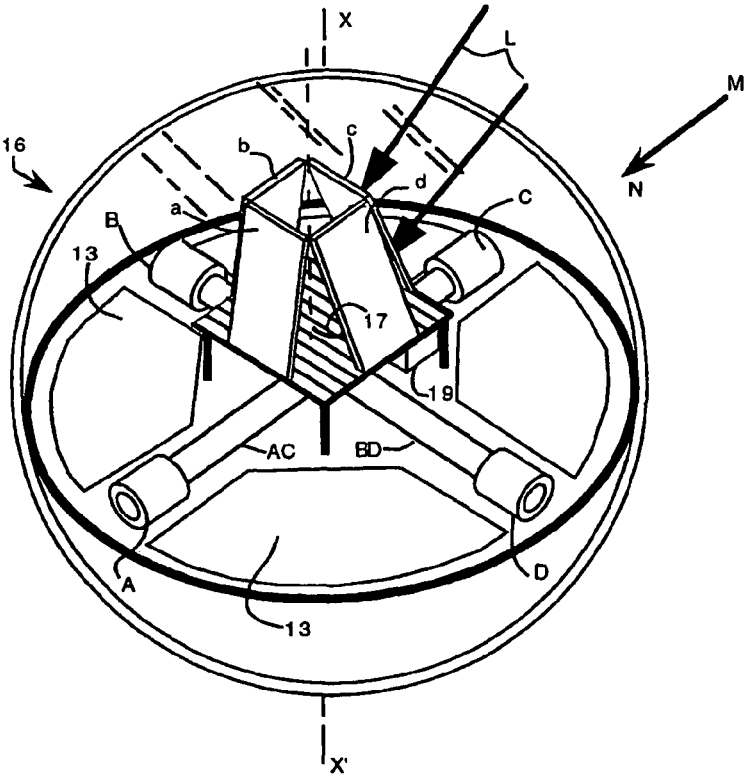
FIG. 3 is a perspective view of a first alternate embodiment of the drive mechanism.

The first alternate embodiment 16 of the drive mechanism illustrated in FIG. 3, relies on a known relationship between the orientation of an ambient magnetic field and the direction of another ambient field of energy such as another magnetic field, a field of radio waves or, as more specifically taught in this embodiment, a field of light waves impinging upon the enclosure. The enclosure spinning torque is derived from the earth magnetic field M and the directional bearing locator function is achieved by sensing the direction of the light waves L. The electrical motor is constituted by two electromagnets AC and BD positioned on the equatorial septum 14 in a cross-array wherein each electromagnet is oriented radially from the axis of rotation X-X'. Four photosensors a, b, c, and d are mounted in a pyramidal configuration wherein the photo-sensitive surface of each sensor lies in a different plane than the plane in which the photo-sensitive surface of any one of the other sensors lies. The angle 17 of the planes in relation to the spinning axis, can vary from zero degrees to approximately 75 degrees. Each plane is generally oriented in the same radial direction as one of the electromagnets. A series of photovoltaic collectors 13 are positioned on the septum 14 so that their photosensitive surfaces are substantially perpendicular to the axis of rotation X-X'. These collectors are wired together to repeatedly and sequentially enable the motor by providing a feeding and polarizing current to the electromagnets as determined by a logic unit 19 mounted under the photosensors a, b, c, and d.

Each of the electromagnets is preferably constituted by low coercivity iron core rod and a wire bobbin A and C or B and D at either end.

Assuming that each control photosensor is generally pointing to the same radial direction as an electromagnet bobbin of same reference, the logic unit 19 performs the following function:

If Ca is the greatest, then enable BD.

If Cb is greatest, then enable AC.

If Cc is greatest, then enable DB.

If Cd is greatest, then enable CA.

Wherein CA, CB, CC and Cd represents the current flowing out of the a, b, c, and d control photosensors respectively, and BD indicates that the BD electromagnet is so polarized as to have its North Pole on the B bobbin side, DB indicates that the BD electromagnet has its North Pole on the D bobbin side, and AC and CA similarly indicate the polarization of the AC electromagnet. This logic can be readily implemented with a gating array or by means of a microprocessor. The phase relationship between the electromagnets and the photosensors can be modified and adjusted for optimal performance.

Instead of comparing the current outputs of the respective photosensors, the logic unit 19 may be designed to respond only to a current output exceeding a preset threshold level indicative of a substantial orthogonal orientation of the sensor in relation to the direction of the magnetic field.

In a variation of the above-described drive mechanism, the control photosensors a, b, c, and d are selected to be of photovoltaic type, large and powerful enough to provide the feeding current to the electromagnets in the absence of the horizontally mounted photovoltaic collectors 13. It should be noted that all of the bobbins will be energized all the time to some degree and that bobbins on opposite ends of a given magnet will tend to magnetize the rod in opposite directions. The net magnetization of a given rod will depend on which bobbin is receiving the greatest current, which depends on which of the two driving photocollectors is receiving the most light. The angular relationship between the photocollector array and the electromagnets can be set to respond to a given magnetic field direction and ambient light direction, to drive rotation essentially the same as was described in FIG. 3.

The electromechanical device can consist of a single electromagnet and a single photosensor. In such a case, the spinning movement of the enclosure may have to be manually initiated.

Figure 6:
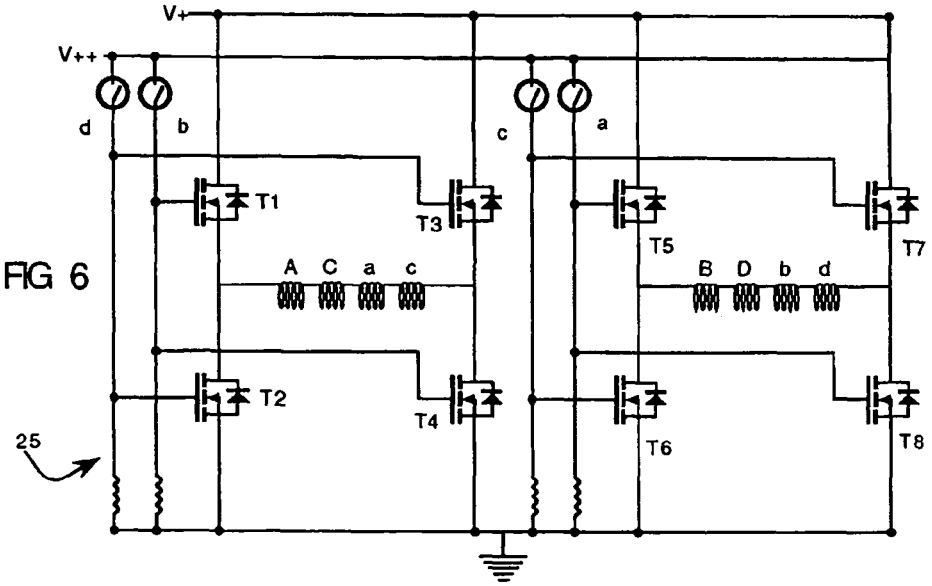
FIG. 6 is a diagram of the electromagnet feeding current circuit.
Figure 4:
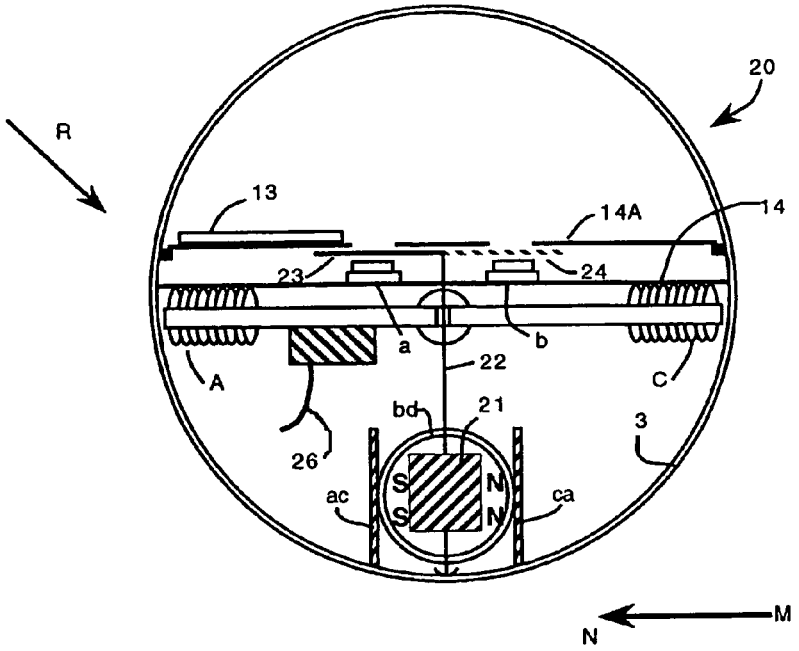
FIG. 4 is a cross-sectional view of a second alternate embodiment of the drive mechanism.
Figure 5:
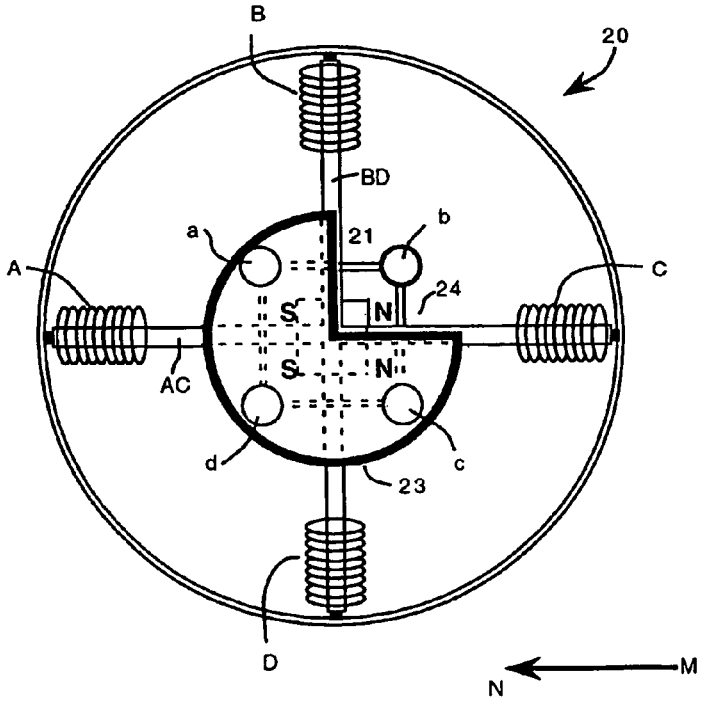
FIG. 5 is a top plan view thereof.

In the second alternate embodiment 20 of the drive mechanism illustrated in FIGS. 4-6, the directional bearing locator is constituted by a magnet 21 that acts like a compass and orients itself with the earth magnetic field M to position and immobilizes the freely rotating axle 22 not unlike the axle 10 in the first embodiment of the driving mechanism. The axle passes through the center of the equatorial septum 14, and mounts at its top a circular shutter 23 having a radial sector 24 of approximately 90 degrees cut out of it. Mounted on the top surface of the septum 14, and under the shutter 23, is a cross-array of photosensors or photovoltaic sensor-collectors a, b, c and d. A second septum 14A parallel to the first is positioned above the shutter, has an aperture above each photosensor, and acts as a diaphragm. As the whole enclosure 3 and septi 14,14A rotate about the central vertical axis X-X', the photosensors are sequentially and periodically exposed, one at a time, to light waves L passing through the transparent or translucent wall of the enclosure. The larger photovoltaic collector 13 mounted on the top surface of the upper septum 14A, has a photo sensitive top surface also exposed to the light waves. The cross-array of electromagnets AC and BD of the previously described embodiments extends to the periphery of the septum 14 which each electromagnet bobbin set at a predetermined angle from one of the photosensors a, b, c or d. When energized, each of the electromagnets tends to orient itself with the earth magnetic field just like the magnet 21 and shutter 23.

The ambient magnetic field along which the electromagnets seek to align themselves, may be the geomagnetic field or the field created by the locator magnet 21 if the latter is powerful enough to supplant the earth magnetic field.

As illustrated in FIG. 6, the control current flowing out of the photosensors a, b, c, and d exposed to the light waves is used to open an electronic matrix 25 of MOSFET switches T1-T8 which distributes the feeding current out of the large photovoltaic sensor 13 to the appropriate electromagnet with the required polarization. When an electromagnet is energized, it seeks to align itself with the ambient magnetic field and cause the entire enclosure to spin counter-clockwise when looked at from the top.

Reed switches, optical and solid state sensors such as Hall-effect sensors can be used to accomplish the commutating functions.

Reflectively mounted mirrors can be disposed on the shutter to increase the amount of light impinging upon the exposed sensor.

In lieu of, or in addition to, the large photovoltaic sensor 13, a radio frequency antenna 26 coupled to a receiver and rectifier unit 27 mounted against the under-surface of the septum 14 can be used to generate a feeding electrical current to the electromagnets. The radio frequency waves R can be generated by a remote transmitter not shown on the drawing.

It should be understood that when photovoltaic sensor-collectors are used to generate the energizing current fed to the electromagnets, there is no need for the electronic switching matrix 25.

Figure 7:
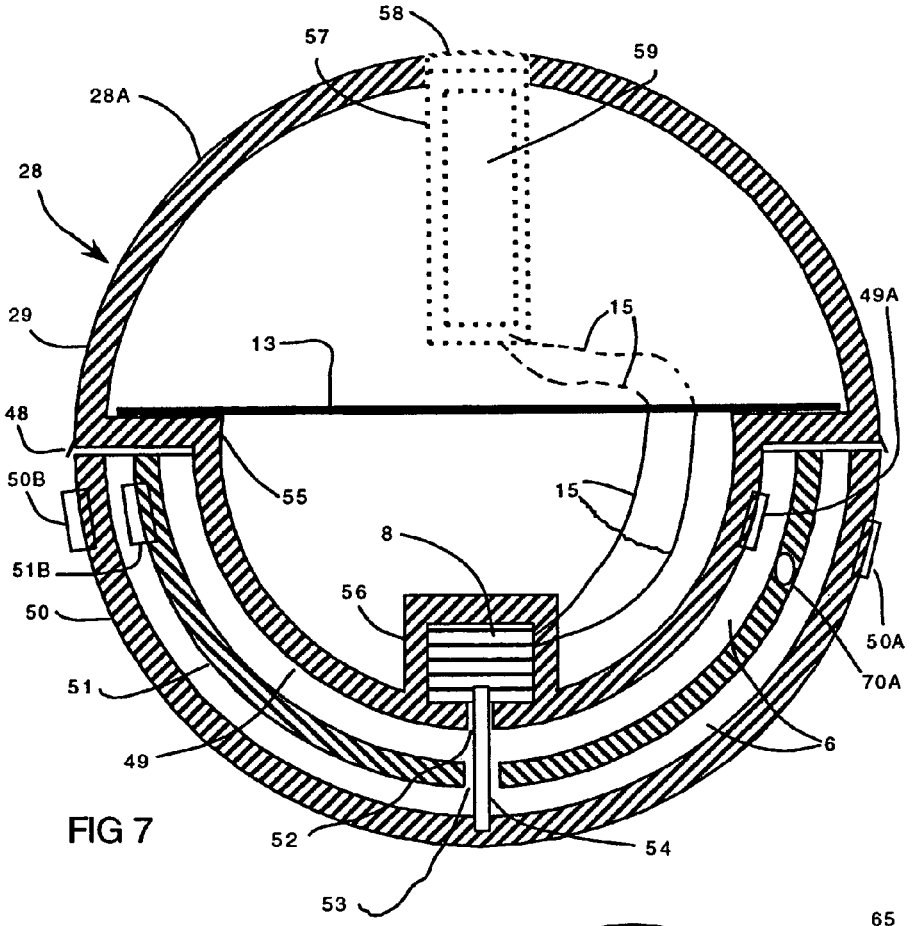
FIG. 7 is a cross-sectional diagram of a third alternate embodiment of the invention.

In the third alternate embodiment 28 of the structure illustrated in FIG. 7, an enclosure 28A comprising an upper hemispherical part 29, preferably displaying a pattern of visible features, and a lower hemispherical part 49 of a slightly smaller radius than the upper hemispherical part 29, preferably displaying a related pattern of visible features aligned with the pattern on the upper part 29, and an annular ring 55. A motor 8 is mounted in a holder 56 in the lower hemispherical part 49, and the motor is connected by a shaft 54, preferably transparent, to a hemispherical container 50. The motor is energized by current from a photovoltaic collector 13 by means of wires 15. Electric current may also be provided by means of wires 15 from a battery 59, mounted in a cavity 57 within the upper hemispherical part 29, where the cavity is sealed by means of a cap 58. An intermediate hemisphere 51, preferably transparent and decorated with visual features appropriate to the visual features of lower hemispherical part 49, can be interposed between the lower hemisphere 49 and the container 50. Layers of fluid 6 occupy the narrow space between the intermediate hemisphere 51 and the container 50 on one side and the lower hemispherical part 49 on the other side. The motor shaft passes through a hole 53 in the intermediate hemisphere 51. Intermediate hemisphere 51 preferably has essentially the same density as the fluid 6. Flaps 48 extending around the circumference of the upper hemisphere 29 preferably hide the gap between the lower part of the upper hemisphere 29 and the top edge of the container 50 from a casual observer.

Current supplied to the motor 8 will cause the enclosure 28A to rotate about a vertical axis. The materials and dimensions of the container 50, fluid 6, intermediate shell 51, and lower hemispherical part 49 of the body, are predetermined to cause visible features or the lower hemispherical part 49 and intermediate shell 51 to be displayed on the outer surface of the container 50. Thus, a casual observer will see what appears to be a simple, continuous object rotating, with an essentially continuous pattern of visible features preferably over its whole surface. The ball will appear to rotate despite frictional forces the observer would expect to exist between the apparently rotating object and any mechanical contact between the outside of the container 50 and any external objects, such as support elements.

The intermediate hemisphere 51 is preferably not connected to any other elements. Thus, it will be driven to rotate by shear forces between its inside surface and the rotating surface of the lower hemispherical part 49. On the other hand, the rotation of the intermediate hemisphere 51 will be retarded by shear forces between its outer surface and the inner surface of the container 50. The net effect will be that the intermediate hemisphere 51 rotates at a different rate, slower than the rate of the enclosure 28A.

The intermediate hemisphere preferably has a visual feature 70A that is displayed on the outer surface of container 50. This can create a very intriguing visual effect in cooperation with a second visual feature on a relatively moving element such as the lower hemisphere 49 or container 50. For example, the lower hemisphere 49 could have the visual features of the earth, and the visual feature 70A could be translucent cloud patterns. Cloud patterns could also be added to the container 50, in which case the cloud patterns could be seen as not moving in spite of the relatively moving visual feature 70A displayed on the surface of container 50, and thereby suggesting the surface is moving. Moving Moire patterns could be displayed by relatively moving objects such as container 50, intermediate hemisphere 51, and lower hemisphere 49 having cooperating patterns of visual features. For example, container 50 could have a visual feature 50A, and the lower hemisphere 49 could have a visual feature 49A, designed to cooperate to produce a kinetic Moire display on the surface of container 50. Kinetic linticular optic images can be displayed on the surface of container 50, by means of a visual feature 50B, in this case a linticular lens pattern, preferably forming at least part of the outer surface of container 50, designed according to well known linticular optic principles, to cooperate with a preferably closely proximate moving internal body, such as intermediate hemisphere 51, having a visual feature 51B.

It is understood that the motor 8 could be virtually any kind of motor. For example, it could be a spring powered motor, wound up by means of a hole in the upper hemisphere 29 in a similar position to the battery holder 64. The position of the motor 8 and its shaft 54 could be inverted from that shown, and photovoltaic cells mounted on the container could provide the driving current. The motor could also be mounted on the intermediate hemisphere 51 driving relative rotation of either the container 50, or the lower hemisphere 49.

Figure 8:
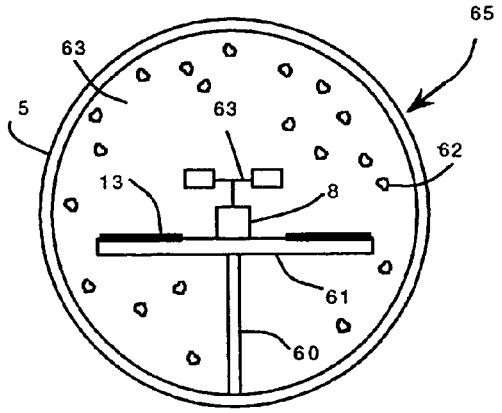
FIG. 8 is a cross-sectional diagram of a fourth alternate embodiment of the invention.

In the fourth alternate embodiment 65 of the structure illustrated in FIG. 8, a container 5 contains a Rheoscopic fluid 63, which is preferably translucent to allow light to reach photovoltaic cells 13, while preferably blocking a clear view of the other elements within the container. A shaft 60 is fixedly attached to the inside surface of container 5 for supporting a disk 61 for mounting the cells 13 and an electric motor 8. The motor drives a fan structure 63 for agitating the fluid. The fluid 63 contains bodies 62, such as small metal particles, suspended in it, and the visible features of at least some of these particles are displayed on the outer surface of container 5 due to the predetermined thickness and refractive index of container 5 and the refractive index of the fluid 63.

Figure 9:
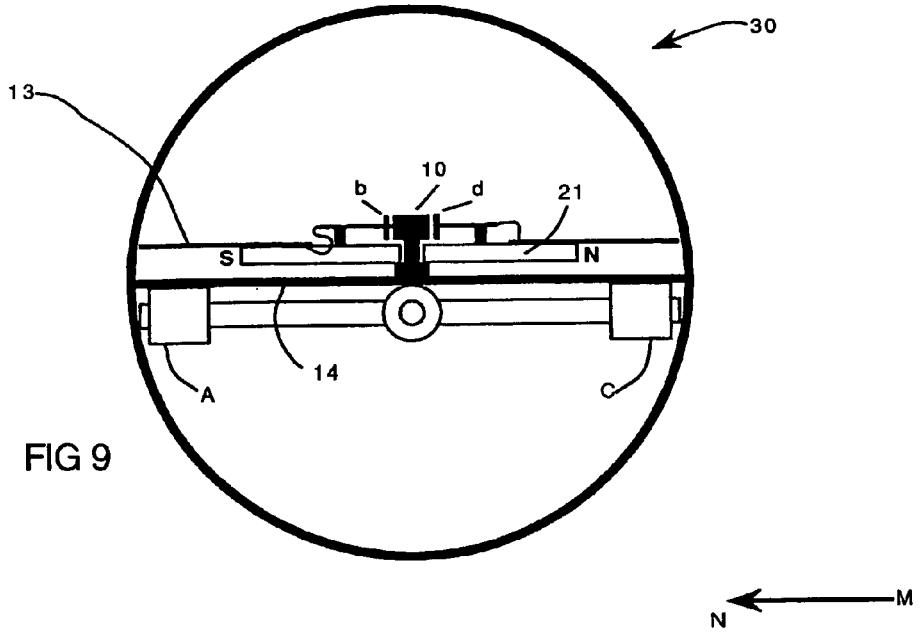
FIG. 9 is a cross-sectional diagram of a fifth alternate embodiment of the drive mechanism.
Figure 10:
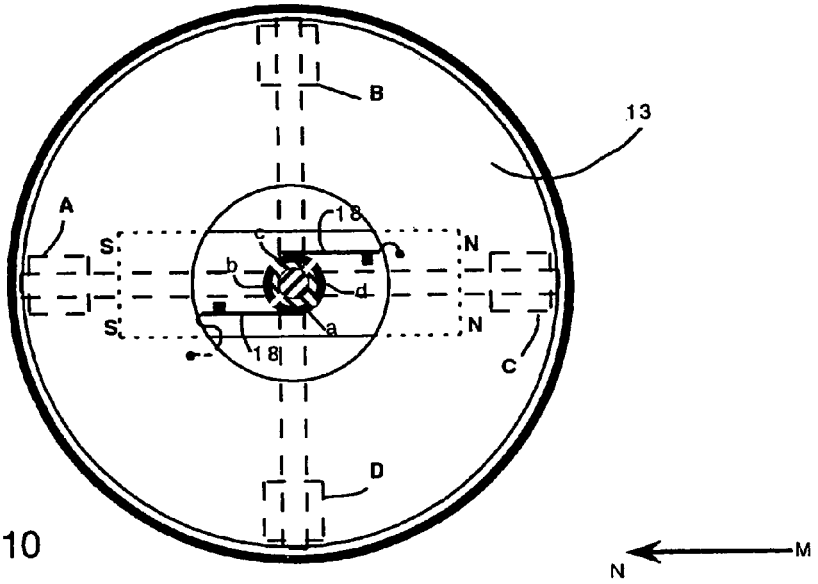
FIG. 10 is a top plan view thereof.

In a fifth alternate embodiment 30 of the drive mechanism illustrated in FIGS. 9 and 10, the magnet 21 acts as the directional bearing locator and the photovoltaic collector 13, and is rotatively mounted on a central axle 10. The axle, as well as the equatorial septum 14, are fixedly attached to the enclosure 3. A set of four ring segments a, b, c and d are mounted proximate the top surface of the axle in a cross-array configuration. As the enclosure spins about axis X-X'; which is coincident with the axle 10, a pair of brushes 18 are used to enable the cross-array of electromagnets A, B, C and D in a similar manner as was disclosed in connection with the previously described embodiments. The sequential and alternate distribution of the feeding current to the electromagnets including their polarity commutation are accomplished according the techniques well known to those with ordinary skill in the art.

It should be understood that the directional bearing locator of the first embodiment of the drive mechanism could be used in connection with the second described embodiment and vice versa, and that the antenna and radio frequency wave receiver could be used in connection with any of the embodiments of the mechanical drive.

The below-described improvements to the various drive mechanisms are not essential to the operation of the preferred embodiment, yet they can advantageously enhance its performances.

In order to cancel any possible effect of the magnetic field generated by the electromagnets AC and BD upon the magnetic directional bearing locator used in some of the previously described versions of the drive mechanisms, a set of four bucking coils ac, bd, ca, and db can be mounted around the compass magnet 21 as illustrated in FIGS. 4 and 5. It should be noted that the four bucking coils and the electromagnets are normally fixedly connected to the enclosure 3. Bucking coils bd and db are aligned with electromagnet BD, and bucking coil ac and ca are aligned with electromagnet AC.

The circuit illustrated in FIG. 6, is used to control the flow of polarizing current through both the electromagnets and the bucking coils. The object is to create through the bucking coils, a magnetic field which is, in the vicinity of the compass magnet 21, substantially equal and opposite to the one concurrently being generated by the corresponding electromagnet by appropriately turning on the transistor switches T1-T8. Is should be noted that, depending upon the type and position of the sensors a, b, c and d, the wiring connections of the various bobbins and coils has to be appropriately switched. In some cases two single orthogonally disposed bucking coils rather than pairs of them may suffice.

Figure 11:
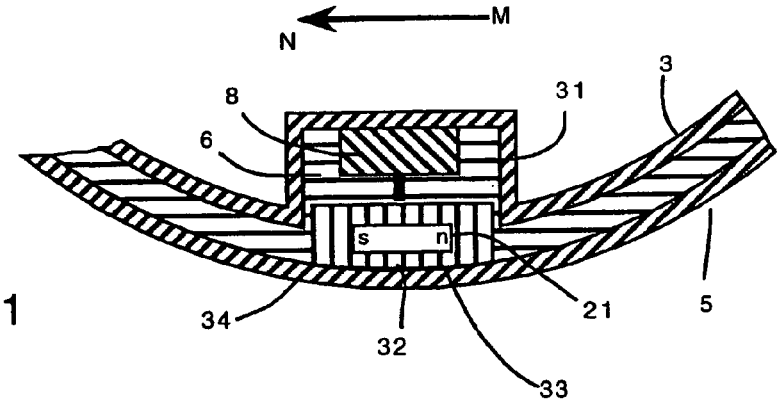
FIGS. 11, 12, and 13 are partial, cross-sectional diagrammatic views of alternate locations of the drive mechanism.
Figure 12:
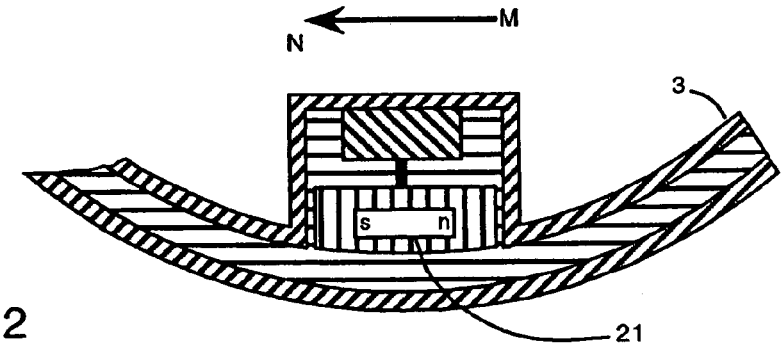
Figure 13:
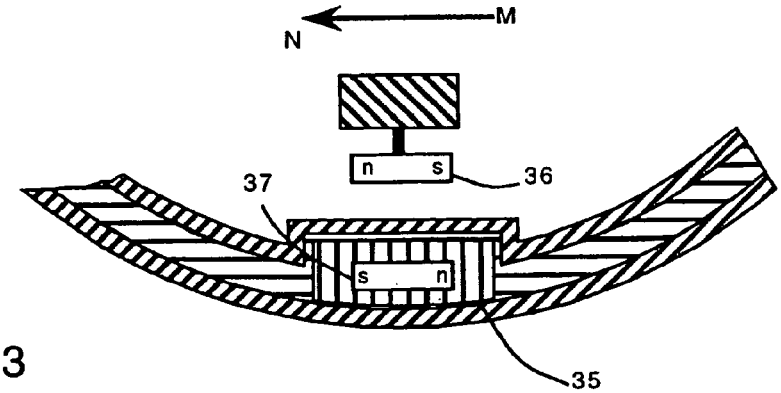

The directional bearing locator and drive mechanism need not always be mounted inside the enclosure 3. As illustrated in FIGS. 11-13, those two elements are immersed in the fluid 6, and fitted into a cylindrical cavity 31 at the South pole of the enclosure 3. In FIG. 11, the drive mechanism consists of the electrical motor 8 fixedly attached to the enclosure, and having its rotor and axle 10 fixedly attached to the directional bearing locator. The latter consists of a magnet 21 buried into a pivot-acting puck 32 having an undersurface 33 spherically contoured to closely match the bottom section 34 of the container. A thin film of fluid between the two surfaces allows for the proper alignment of the magnet with the geomagnetic field. A non-magnetized puck may be used. The puck, in response to gravity or the ambient field of intermolecular forces, creates enough friction or shear forces in the film of fluid or static friction against the bottom surface of the container to provide the counter-torque necessary to the motor to spin the enclosure. The bottom of the puck may also be kept distally from the container as shown in FIG. 12.

In the embodiment of the drive mechanism shown in FIG. 13, while the directional bearing locator is outside the enclosure, the motor is within. Coupling between the motor axle and the puck 35 is provided across the enclosure wall by means of matching magnets 36,37, one attached to the axle, the other to the puck. Appropriate bearings may be used between the puck and the enclosure, and the respective locations of the motor and puck may be inverted. In which case, the feeding current may be derived from structures located without the enclosure.

The enclosure 3 in FIG. 12 could also be powered to rotate by means of a magnetic interaction between magnet 21 and a rotating ambient magnetic field, generated, for example, by means integral to a support, not shown, for the container 5. The rotation of the enclosure could be enhanced in this way when the motor 8 is being supplied current. Furthermore, the rotation could be driven even when the motor 8 is not being supplied current. A similar embodiment could be made without the motor 8, and be driven only by the rotating ambient magnetic field and a magnet 21.

Instead of a cross-array of electromagnets, a single electromagnet may suffice to drive a particularly light enclosure. As illustrated in FIGS. 14 and 15, a single sensor 38 mounted on a single electromagnet AB can be advantageously used to control the polarization of the bobbins A and B.

As more specifically shown in FIG. 15, a bipolar voltage (V+, V−) is applied to plates 39,40 sandwiching an elongated Hall-Effect sensing element 41. The element is mounted horizontally on the electromagnet or its support axle. When the ambient magnetic field M is perpendicular to the element 41, it generates a Hall Voltage between the plates 39,40.

If the direction of the magnetic field is reversed, the polarity of the Hall Voltage will be inverted. Thus, the Hall Voltage can be applied to the bobbins A, B through an amplifier 42 to control their directional polarization.

If the sensor element 38 is perpendicular to the electromagnet as shown in FIG. 14, the latter will be energized only when it is out of alignment with the ambient magnetic field.

The container and enclosures may take a variety of shapes. Illustrated in FIG. 16 is a set of nested cylindrical structures in which the outer one 43 acts like the container and the inner one 44 acts as the enclosure of the previously described embodiment. Both structures and the separating fluid 45 are light permeable. The outer structure 43 rest on a support 46. The directional bearing locator is simply constituted by a shutter pattern 47 printed upon, or embedded into the central top portion of the outer structure 43. This pattern is essentially similar to the shape of the shutter illustrated in FIGS. 4 and 5, and must be manually oriented so that the center of the angular cutout appropriately controls the energizing of the electromagnets.

Photosensors a, b, c, d (the latter not shown on the cross-sectional view) are installed against or into the roof of the enclosure 44 in a cross-arrangement under the shutter pattern. The main photovoltaic collector 13 and electromagnet array AB and CD are essentially similar to those described in the embodiments of FIGS. 4 and 5.

Figure 17:
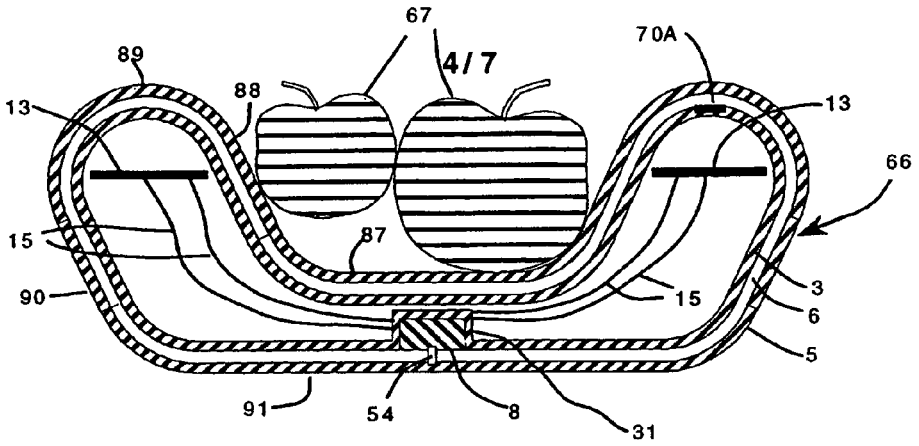
FIG. 17 is a cross-sectional diagrammatic view of a bowl shaped embodiment of the invention.

A bowl shaped embodiment 66 of the structure is illustrated in FIG. 17, which comprises a container 5 comprising an internal wall 88, spaced apart from an external wall 90, a base 91 integral with the external wall 90, a bottom 87 integral with the internal wall 88 and spaced apart from the base 91, and an edge area 89 where the internal wall 88 joins the external wall 90. Internal wall 88, external wall 90, base 91, bottom 87 and edge part 89 are intended to be joined together to form a hollow, preferably sealed container, containing, and preferably filled by, a fluid 6 and a bowl shaped enclosure 3 nested within container 5. The net density of the bowl shaped enclosure 3 is preferably the same as the fluid 6.

The bowl shaped enclosure 3 comprises wires 15 for delivering current from photovoltaic cells 13 to a motor 8 mounted within a cylindrical cavity 56. The bowl shaped enclosure 3 has a visible feature 70A shown on the top edge of bowl shaped enclosure 3, but it us understood that the enclosure 3 could have this visible feature at other positions.

The materials, shape and dimensions of the container 5, fluid 3, and bowl shaped enclosure 3 are chosen so that the bowl shaped enclosure 3 has at least one visible feature 70A that is displayed, kinetically that is, on the outer surface of container 5.

While structure 66 is the preferred embodiment for a bowl embodiment, it is understood that many similar embodiments fall within the scope of the instant invention. For example, the bowl shaped enclosure 3 need not be hollow as shown in FIG. 17. The overall shape of the structure could be an inverted cone shape, with only inside walls and outside walls. The volume between the body 3 and container need not be sealed or completely filled with fluid 6. The bowl shaped enclosure 3 could be replaced, as in FIG. 8, by a fan 63 and the fluid 6 could contain one or more bodies of arbitrary shape, substantially buoyantly supported by the fluid 6.

Objects 67 can be contained within the bowl shaped depression formed by the bottom 87 and the inside wall 88 of container 5.

Figure 18:
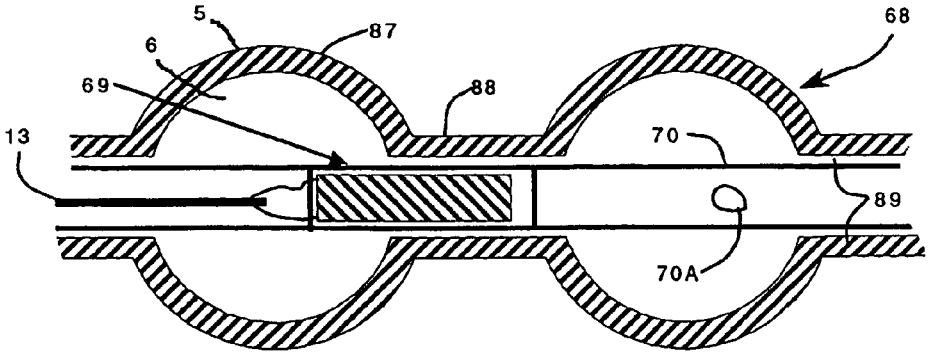
FIG. 18 is a cross-sectional diagrammatic view of a sixth embodiment of the invention.
Figure 19:
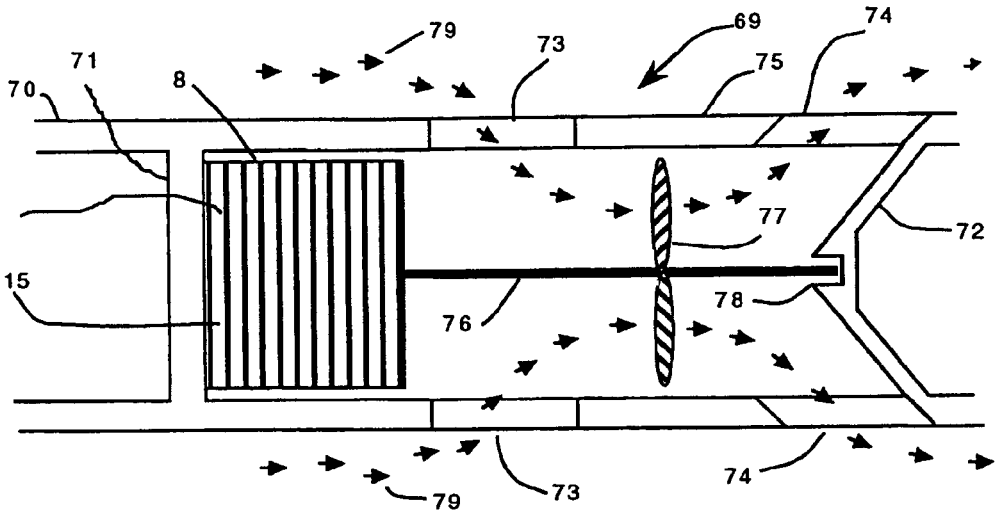
FIG. 19 is a cross-sectional diagrammatic view of a subassembly of FIG. 18.

A section of a sixth alternate embodiment 68 of the structure is illustrated in FIGS. 18 and 19. A section of a preferably transparent container 5 includes an alternating sequence of hollow cylindrical areas 88 and hollow spherical areas 87. A preferably translucent tube shaped body 70 passes through the hollow passages in the cylindrical parts 87 and spherical parts 88 of container 5. A fluid 6 preferably fills the space between the outside surface of the tube body 70 and the inside surfaces of the container 5. The net density of the tube 70 is preferably the same as the fluid density, and the density of the tube is preferably uniform along its length. The tube 70 preferably includes at least one visual feature 70A which will be visible on the surface of the cylindrical parts 88 of the container due to the dimensions and index of refraction of the fluid, and container material. Preferably, visual features of the tube body 70 will not appear on the surface of at least one of the spherical areas of the container. A photovoltaic cell 13 mounted within the tube 70 supplies current to a drive assembly 69 mounted within the tube body 70.

Embodiment 68 is an example of an embodiment wherein contact with the arcuate wall area 88 can exist between area 88 and an external object that is stationary with respect to area 88, or can exist between area 88 and an object that is part of container 5, such as spherical part 87, which is not designed to kinetically display, on its surface, visual feature 70A.

The drive assembly 69 shown in FIG. 19 comprises a motor 8 mounted within the tube 70 by means of element 71. Current is supplied to the motor by means of wires 15. The motor output shaft 76 drives the rotation of a propeller 77 and is supported at its distal end by a journal bearing 78. Holes 73 and 74 in the wall of the tube body 70 allow fluid 79 to be drawn in holes 73 and pushed out holes 74 to create a thrust, urging the tube 70 to move to the left.

The structure 68 can be a section of a longer linear structure or a longer circular structure of the same form. In the case of a linear structure, motion of the tube will be linear, and can be periodically reversed or the motion can be rotational about the long axis of the body 70. In the case of a circular structure, motion will be circular and can be continuous or reciprocating. In either case, a casual observer will see the spherical parts as independent objects threaded by a moving tube part. The spherical parts could have other shapes such as cubic and still show the same effect and the cross sectional shape of the cylindrical part 88 and tube 70 could have other, preferably similar, cross sectional shapes. Various other drive mechanisms described herein could also be adapted to drive such bodies.

Figure 20:
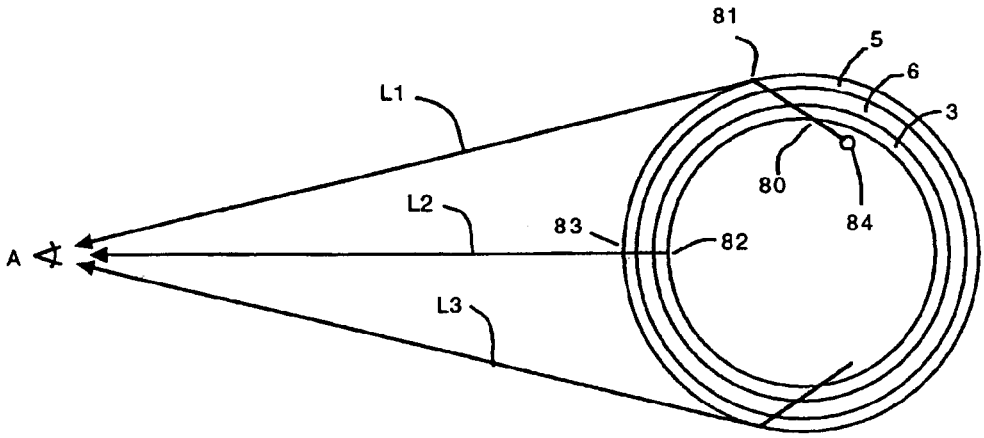
FIG. 20 is a cross-sectional diagrammatic view of a spherical body within a spherical container, showing the paths of light rays.

FIG. 20 illustrates how a visible feature 80 on the inside surface of a translucent spherical body 3 surrounded by a fluid 6, will appear to an observer A to be displayed on the outside surface of a spherical, preferably transparent, container 5, according to well known laws of refraction. Light ray L1 originating at feature 80 on the inside surface of body 3 is shown propagating first to position 81 on the outside surface of container 5 and then on to an observer A. Light ray L1 is shown tangent to the surface of container 5 at location 81. Similar rays L3 are indicated in the lower part of FIG. 20. Light ray L2 originating at visual feature 82 on the inside surface of body 3 is shown propagating first to position 83 on the outside surface of container 5 and then on to observer A. For simplicity, Light ray L1 is shown as following a straight path from feature 80 to location 81, as it would if the indexes of refraction of the materials of body 3, fluid 6, and container 5 were the same. It is understood that small differences in these indexes of refraction would cause the light path to deviate from a straight line without substantially changing the result. An observer at position A will thus see a visual feature 80 on the body 3 displayed on the surface of container 5 at location 81. Light ray L2 originating on the inside surface of body 3 at visual feature 82 will move along a straight path to observer A because the light passes perpendicularly through the interfaces between different materials along its path.

It is understood that light originating on a visible feature located anywhere along light ray L1, particularly inside container 5, can be seen as displayed on the outer surface of container 5 at position 81. Thus, a feature on the inside surface, within the wall, or on the outer surface of body 3, within the fluid 6, on the inside surface, within the wall, or on the outside surface of container 5, or on an intermediate shell, such as 51 of FIG. 7, could be displayed on the outside surface of the substantially transparent container 5 at location 81. A visual feature 84 located within body 3 could also follow light ray path L1 and be displayed at location 81.

A casual observer at position A will see visual feature 80 kinetically displayed on the surface of the container 5 at position 81 whenever the visual feature 80 is actually moving, and the observer at A will believe that visible feature 80 is actually on the surface of container 5 at position 81 and that the surface of the container 5 is actually moving at position 81. The observer at position A may also judge other positions, such as 83 of the outer surface of container 5, to be moving, depending on their proximity to position 81 and to similar, apparently moving areas. This illusion is particularly interesting if an apparently stationary object or visual feature is in contact with the outer surface of container 5 at positions judged to be moving.

While the preferred embodiments of the invention have been described, modifications can be made and other embodiments may be devised without departing from the spirit of the invention and the scope of the appended claims.

What is claimed is:

[1. A self powered, animated structure which comprises:

a container which comprises at least one transparent, arcuate wall portion having an outer surface area;

a body, within said container, having a first visible feature refractively and kinetically displayed on said outer surface area;

a drive mechanism for moving said body with respect to said container; and, a battery powering said drive mechanism;

whereby, to a casual observer, said outer surface area appears to move with said body.]

2. [The structure of claim 1, which further comprises:

a thin layer of fluid between said body and said wall portion, said fluid having an index of refraction larger that of air] *An animated structure which comprises:*

*a rotating body;*

*a container holding said body, said container comprising at least one light permeable wall portion having an outer surface area and an inner surface area;*

*a light energized drive mechanism for rotating said body;*

*said body comprising an enclosure housing said drive mechanism;*

*said enclosure including a wall having a graphic portion translucently permeable to light waves energizing said drive mechanism and sufficiently diffused to conceal said drive mechanism;*

*a volume of fluid between said enclosure and said inner surface area;*

*said graphic portion moving between a source of said light waves and said drive mechanism;*

*said fluid having an index of refraction larger than that of air; and*

*said drive mechanism moving said body with respect to said container;*

*whereby, to a casual observer, said outer surface area appears to move with said body.*

3. [The structure of claim 2,] *An animated structure which comprises:*

*a rotating body;*

*a container holding said body, said container comprising at least one light permeable wall portion having an outer surface area and an inner surface area;*

*a light energized drive mechanism for rotating said body;*

*said body comprising an enclosure housing said drive mechanism;*

*said enclosure including a wall having a graphic portion translucently permeable to light waves energizing said drive mechanism and sufficiently diffused to conceal said drive mechanism;*

*a volume of fluid between said enclosure and said inner surface area; and*

*said graphic portion moving between a source of said light waves and said drive mechanism;* wherein a volume of said fluid is held within said container; and wherein said body is immersed in said fluid.

4. The structure of claim 3, wherein said container and said body have substantially similar shapes, said body being nested within said container.

5. The structure of claim 2, which further comprises an object in contact with said outer surface; whereby said outer surface appears to be moving with respect to said object.

6. [The structure of claim 2,] *An animated structure which comprises:*

*a rotating body;*

*a container holding said body, said container comprising at least one light permeable wall portion having an outer surface area and an inner surface area;*

*a light energized drive mechanism for rotating said body;*

*said body comprising an enclosure housing said drive mechanism;*

*said enclosure including a wall having a graphic portion translucently permeable to light waves energizing said drive mechanism and sufficiently diffused to conceal said drive mechanism;*

*a volume of fluid between said enclosure and said inner surface area; and*

*said graphic portion moving between a source of said light waves and said drive mechanism;* wherein said drive mechanism is biased by the direction of an ambient field of energy.

7. The structure of claim 6, wherein said [body further comprises:

an enclosure] *enclosure is* substantially buoyantly supported by a volume of said fluid;

a directional bearing locator associated with said enclosure and responsive to said ambient field of energy; and wherein said drive mechanism comprises [means for moving said enclosure in reference to said locator and in response to energy from said battery] *a counter-torque-producing element anchored by said locator.*

8. The structure of claim 7, wherein said drive mechanism comprises an electromechanical device for rotating said enclosure about a first axis.

9. The structure of claim 8, wherein said ambient field of energy comprises the earth's gravity; and said locator comprises a gravity force sensor.

10. The structure of claim 9, wherein said gravity force sensor comprises a weight mounted on an axle substantially aligned with said axis; said weight having a center of gravity held distally from said axis.

11. The structure of claim 8, wherein said ambient field of energy comprises the earth magnetic field; and said locator comprises means for detecting said earth magnetic field.

12. The structure of claim 8, wherein said [enclosure is held within said container and spaced apart thereof by said fluid] *first axis is substantially vertical.*

13. The structure of claim 12, wherein said enclosure and said container are closed and said fluid substantially surrounds said enclosure wherein said enclosure and said container have similar shapes.

14. The structure of claim 13, wherein said enclosure and said container consist of hollow spheres.

15. The structure of claim 8, wherein said electromechanical device comprises:

a motor having a rotor and a stator, one of said rotor and stator being fixedly attached to said enclosure, and the other fixedly attached to said locator.

16. The structure of claim 8, wherein said ambient field of energy comprises a magnetic field; and said electromechanical device comprises: at least one magnetic field sensor responsive to said magnetic field; and means for repeatedly enabling said sensor.

17. The structure of claim 16, wherein said locator comprises a magnetic field sensor.

18. The structure of claim 16, wherein:

each of said sensors comprises an electromagnet which when enabled rotatably aligns itself with said magnetic field; and said means for enabling comprise means for selectively applying a feeding current to said electromagnet.

19. The structure of claim 18, wherein said means for selectively applying comprise a commutating mechanism connectively biased by said locator to enable said electromagnet when said electromagnet is not aligned with said magnetic field.

20. The structure of claim 19, wherein the magnetic field comprises the earth's magnetic field.

21. The structure of claim 19, which further comprises at least one means positioned outside said enclosure to generate said magnetic field.

22. The structure of claim 9, wherein said gravity force sensor comprises a weight rotatably connected to said enclosure, said weight having a center of gravity held distally from said axis.

23. The structure of claim 18, wherein said means for selectively applying comprise a mechanism responsive to the relative orientation of said magnetic field and the direction of said ambient field of energy.

24. The structure of claim 23, wherein;

said ambient field of energy comprises light waves impinging upon said enclosure; and said mechanism comprises:

at least two photosensors for producing control currents for said electromagnet;

each of said sensors having a photosensitive surface, wherein the photo-sensitive surface of each of said sensors lies within a different plane than the plane of the photosensitive surface of any other sensor.

25. The structure of claim 24, which further comprises at least one photovoltaic collector having a photo-sensitive surface, and producing said feeding current.

26. The structure of claim 11, wherein said electromechanical device comprises at least one electromagnet generating a polarizing magnetic field; and which further comprises at least one coil proximate to said means for detecting, and to energize said coil and create a corrective magnetic field opposite to said polarizing magnetic field.

27. The structure of claim 16, wherein said means for repeatedly enabling said sensor comprise means mounted on said magnetic field sensor, for generating a voltage having a polarity responsive to the orientation of said sensor.

28. [The structure of claim 1,] *An animated structure which comprises:*

*a rotating body;*

*a container holding said body, said container comprising at least one light permeable wall portion having an outer surface area and an inner surface area;*

*a light energized drive mechanism for rotating said body;*

*said body comprising an enclosure housing said drive mechanism;*

*said enclosure including a wall having a graphic portion translucently permeable to light waves energizing said drive mechanism and sufficiently diffused to conceal said drive mechanism;*

*a volume of fluid between said enclosure and said inner surface area;*

*said graphic portion moving between a source of said light waves and said drive mechanism; and* including a *first and* second visual feature, wherein said first and second visual features cooperatively move relative to each other.

29. The structure of claim 3, wherein said container and said body have substantially toroidal shapes.

30. [The structure of claim 1,] *An animated structure which comprises:*

*a rotating body;*

*a container holding said body, said container comprising at least one light permeable wall portion having an outer surface area and an inner surface area;*

*a light energized drive mechanism for rotating said body;*

*said body comprising an enclosure housing said drive mechanism;*

*said enclosure including a wall having a graphic portion translucently permeable to light waves energizing said drive mechanism and sufficiently diffused to conceal said drive mechanism;*

*a volume of fluid between said enclosure and said inner surface area; and*

*said graphic portion moving between a source of said light waves and said drive mechanism;* wherein said container is substantially bowl shaped comprising:

an external wall;

an internal wall spaced apart from said external wall;

a base integral with a lower section of said external wall;

a bottom spaced apart from said base and being integral with a lower section of said wall; and, a top edge joining upper sections of said walls.

31. The structure of claim 29, wherein at least one section of said container is made with materials and dimensions predetermined for not displaying said [first visible feature] *graphic portion* on said outer surface area of said container.

32. The structure of claim 4, wherein said container is substantially bowl shaped comprising:

an external wall;

an internal wall spaced apart from said external wall;

a base integral with a lower section of said external wall;

a bottom spaced apart from said base and being integral with a lower section of said internal wall; and, a top edge joining upper sections of said walls wherein said body is substantially bowl shaped and nested within said bowl shaped container.

*33. The structure of claim 6, wherein said field is substantially stationary.*

*34. An animated structure which comprises:*

*a rotating body;*

*a container holding said body, said container comprising at least one light permeable wall portion having an outer surface area and an inner surface area;*

*a light energized drive mechanism for rotating said body;*

*said body comprising an enclosure housing said drive mechanism;*

*said enclosure including a wall having a graphic portion translucently permeable to light waves energizing said drive mechanism and sufficiently diffused to conceal said drive mechanism;*

*a volume of fluid between said enclosure and said inner surface area; and*

*said graphic portion moving between a source of said light waves and said drive mechanism;*

*wherein said drive mechanism is an electric motor; and said motor is powered by a device selected from the group consisting of:*

*a battery;*

*a photovoltaic cell; and,*

*an antenna.*

*35. The structure of claim 34, wherein said cell is contained within said body.*

*36. An animated structure which comprises:*

*a rotating body;*

*a container holding said body, said container comprising at least one light permeable wall portion having an outer surface area and an inner surface area;*

*a light energized drive mechanism for rotating said body;*

*said body comprising an enclosure housing said drive mechanism;*

*said enclosure including a wall having a graphic portion translucently permeable to light waves energizing said drive mechanism and sufficiently diffused to conceal said drive mechanism;*

*a volume of fluid between said enclosure and said inner surface area; and*

*said graphic portion moving between a source of said light waves and said drive mechanism;*

*wherein said body is supported exclusively by said volume of fluid.*

*37. The structure of claim 7, wherein said directional bearing locator comprises a first permanent magnet.*

*38. A display device which comprises:*

*a container comprising light permeable walls;*

*a volume of light permeable liquid held by said container;*

*wherein said volume comprises two immiscible fluids of different densities;*

*an object held in and surrounded by said volume; and*

*a drive mechanism carried by said object causing movement of said object with respect to said container.*

*39. The device of claim 38, wherein said movement is rotational.*

*40. The device of claim 38, wherein said drive mechanism comprises an electric motor, and a photovoltaic collector powered by light passing through said container and said liquid.*

*41. The device of claim 38, which further comprises:*

*said light permeable walls comprising a portion having an outer surface area;*

*said object including a wall having a graphic portion translucently permeable to light waves and sufficiently diffused to conceal said drive mechanism;*

*said graphic portion being refractively and kinetically displayed on said outer surface area, whereby, to a casual observer, said outer surface area appears to move with said object.*

*42. A display device which comprises:*

*a sealed container;*

*a light permeable liquid contained within said container;*

*a moveable first object surrounded by said liquid;*

*wherein said liquid includes:*

*a first fluid having a first density and a first index of refraction; and,*

*a second fluid immiscible with said first fluid;*

*said second fluid having a second density different from said first density and a second index of refraction different from said first index, wherein an optical distortion between said first and second fluids is not noticeable to an observer; and*

*wherein the respective volumes of said first fluid and said second fluid are adjusted to buoy said first object in absence of a mechanical link between said first object and the container.*

*43. The device of claim 42, which further comprises*

*a drive mechanism carried by said object causing movement of said object with respect to said container, and wherein said drive mechanism comprises an electric motor, and a photovoltaic collector powered by light passing through said container and said liquid.*

* * * * *